March 13, 1956 — W. D. PYLE — 2,738,031
WATCHMAKER'S OIL CUP
Filed March 17, 1954
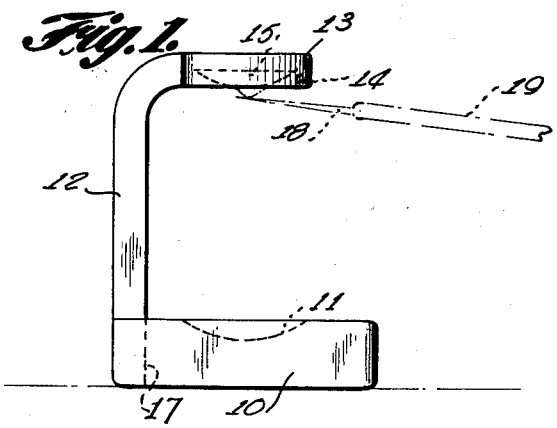
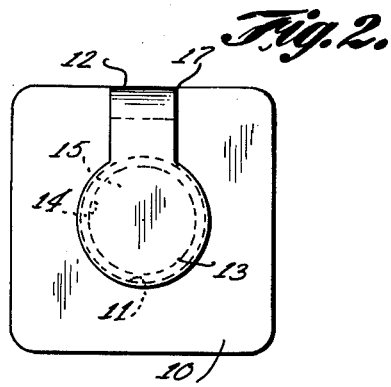
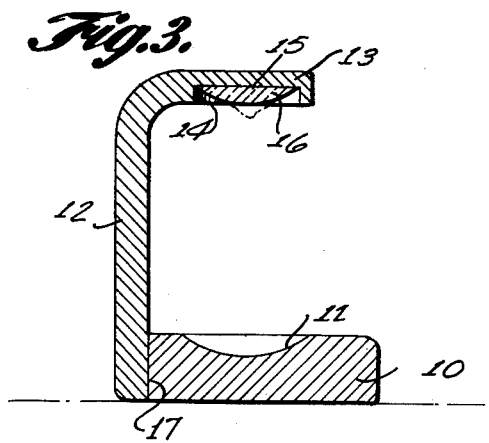
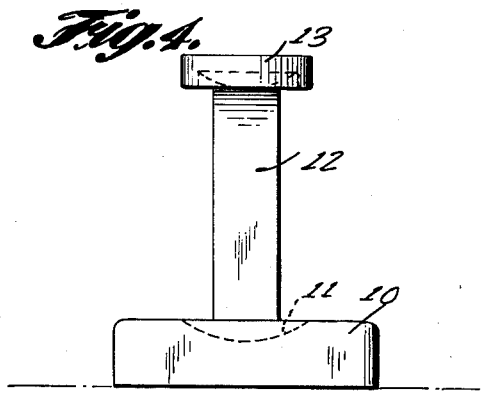
INVENTOR.
William D. Pyle
BY Victor J. Evans & Co.
ATTORNEYS

United States Patent Office 2,738,031
Patented Mar. 13, 1956

2,738,031

WATCHMAKER'S OIL CUP

William D. Pyle, Indianapolis, Ind., assignor of one-half to Emery C. Tharp, Indianapolis, Ind.

Application March 17, 1954, Serial No. 416,895

3 Claims. (Cl. 184—1)

This invention relates to tools used by watchmakers and the like, and in particular a small stand having an inverted substantially conical-shaped oil drop in a recess in a horizontally disposed arm of a stand in which the stand extends upwardly from and is supported by a base having a recess in the upper surface, and in which the recess is aligned with the conical-shaped drop of oil.

The purpose of this invention is to facilitate lubricating bearings and other comparatively small parts of watches and the like by providing oil in suspension in the under surface of an oil retaining device whereby oil drops by gravity in combination with capillary attraction upon a needle positioned against the under surface of the body of oil so that a comparatively large amount of oil may be deposited with each application.

In placing the point of a needle in a small bottle of oil the drip of the oil from the needle prevents retaining large quantities of oil thereon so that it is necessary to make several applications in order to oil a single bearing. Furthermore with the oil positioned in an open disc, or the like, the oil is exposed to dirt, dust, and the like. With this thought in mind this invention contemplates a device in which oil is suspended in tension from the surface of a crystal in the under side of an arm so that, when engaged by a needle a comparatively large amount of oil is deposited upon the needle and with the oil in the upper surface of the arm it is not subjected to dust, dirt and the like.

The object of this invention is, therefore, to provide an oil retaining device or reservoir wherein oil is retained in suspension so that it will readily flow upon a needle or the like.

Another object of the invention is to provide a continuously open oil retaining device so that a jeweler working with watch parts held in one hand may readily take oil from the oil retaining device with a needle held in one hand.

A further object of the invention is to provide an oil retaining device for watchmakers and the like in which the oil is continuously exposed and held in suspension in which the device is of a simple and economical construction.

With these and other objects and advantages in view the invention embodies a stand having a base with a recess in the upper surface and having a post or arm with a horizontally disposed disc having a recess in the under surface extended upwardly therefrom and said disc having a crystal with a convex under surface positioned therein.

Other features and advantages of the invention will appear from the following description taken in connection with the drawing, wherein:

Figure 1 is a side elevational view illustrating the improved watchmakers' oil cup and showing an instrument or point in the position of receiving oil from the under surface of the crystal, the instrument being shown in broken lines.

Figure 2 is a plan view of the oil cup.

Figure 3 is a vertical section through the oil cup showing a drop of oil suspended from the crystal with the drop of oil shown in broken lines.

Figure 4 is a front elevational view of the improved oil cup.

Referring now to the drawing wherein like reference characters denote corresponding parts the improved oil cup of this invention includes a base 10 having a recess 11 in the upper surface, a post 12 extended upwardly from the base and having a disc 13 with a recess 14 in the under surface extended from the upper end, and a crystal 15 having a convex under surface 16 positioned in the recess of the disc.

In the design shown the lower end of the post 12 is positioned in a notch or recess 17 in one side of the base 10, however, it will be understood that the post may be secured to the base by other suitable means.

It will also be understood that the parts may be of different designs and of different shapes and the parts may also be made of any suitable material.

With the parts as disclosed and described a drop of oil is applied to the lower surface of the crystal 15 and with the oil suspended from the surface of the crystal it will assume a conical-shape with the point in the center of the crystal.

With the oil suspended in this manner it is protected from dust, dirt, and the like and oil from the drop may readily be taken by a point, such as the point 18 on an instrument 19, as shown in Fig. 1. With the oil flowing downwardly by gravity upon the point a greater amount of oil is retained on the point than when the point is withdrawn from a bottle or other container.

By this means a watchmaker may readily apply oil to essential points of a watch or the like.

It will be understood that modifications, within the scope of the appended claims, may be made in the design and arrangement of the parts without departing from the spirit of the invention.

What is claimed is:

1. An oil cup comprising a base, a post extended upwardly from the base, and an oil retaining element carried by the upper part of the post, said oil retaining element being horizontally disposed and having a convex under surface on which oil is adapted to be suspended with the oil assuming a conical shape.

2. An oil retaining device comprising a base having a recess in the upper surface with a post extended upwardly from one side and with a horizontally disposed disc having a recess in the under surface carried by the upper end of the post and a crystal having a convex under surface positioned in the recess of the disc.

3. In an oil retaining device, the combination which comprises a horizontally disposed base having a concave recess in the upper surface and having a post extended upwardly from one side, said post having a horizontally disposed disc with a recess in the under surface extended from the upper end, and a crystal having a convex under surface positioned in the recess of the disc whereby oil positioned on the surface of the crystal is suspended from the crystal with the oil assuming an inverted conical shape.

References Cited in the file of this patent

UNITED STATES PATENTS

| 1,017,225 | Martin | Feb. 13, 1912 |
| 1,201,011 | Baldwin | Oct. 10, 1916 |